United States Patent
Tobari et al.

(10) Patent No.: US 7,443,120 B2
(45) Date of Patent: Oct. 28, 2008

(54) FIELD WEAKENING VECTOR CONTROLLER FOR PERMANENT MAGNET SYNCHRONOUS MOTOR AND CONTROL MODULE

(75) Inventors: Kazuaki Tobari, Hitachiota (JP); Daisuke Maeda, Hitachi (JP); Tsunehiro Endo, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/583,094

(22) Filed: Oct. 19, 2006

(65) Prior Publication Data
US 2007/0085507 A1    Apr. 19, 2007

(30) Foreign Application Priority Data
Oct. 19, 2005    (JP) .............................. 2005-303817

(51) Int. Cl.
*H02P 21/05*    (2006.01)
*H02P 6/10*    (2006.01)

(52) U.S. Cl. ............................ 318/400.02; 318/400.23; 318/710

(58) Field of Classification Search ................. 318/595, 318/606, 700, 710, 722, 721, 746, 747, 801, 318/400.01, 400.02, 400.23, 720, 723, 724, 318/711
See application file for complete search history.

(56) References Cited

U.S. PATENT DOCUMENTS

| | | | | |
|---|---|---|---|---|
| 4,814,677 A * | 3/1989 | Plunkett | ................ | 318/400.02 |
| 6,184,648 B1 * | 2/2001 | Kato et al. | .................. | 318/811 |
| 6,304,052 B1 * | 10/2001 | O'Meara et al. | ............ | 318/700 |
| 6,429,620 B2 * | 8/2002 | Nakazawa | .................. | 318/701 |
| 6,741,060 B2 * | 5/2004 | Krefta et al. | ................. | 318/727 |
| 7,235,947 B2 * | 6/2007 | Tanaka et al. | ............... | 318/712 |
| 7,394,214 B2 * | 7/2008 | Endo et al. | .................. | 318/432 |

FOREIGN PATENT DOCUMENTS

| | | |
|---|---|---|
| JP | 08-182398 | 7/1996 |
| JP | 2002-095300 | 3/2002 |

* cited by examiner

*Primary Examiner*—Bentsu Ro
(74) *Attorney, Agent, or Firm*—Antonelli, Terry, Stout & Kraus, LLP.

(57) ABSTRACT

A field weakening vector controller is disclosed which calculates a d-axis current command value for a power converter to drive a permanent magnet synchronous motor. The field weakening vector controller includes a stabilization calculator, a d-axis current command calculator, a q-axis current command calculator, and a phase calculator. The d-axis current command calculator corrects the d-axis current command value, while the stabilization calculator calculates a product of the phase error and the d-axis command value. The q-axis current command calculator corrects the q-axis current command value using this product.

12 Claims, 7 Drawing Sheets

FIELD WEAKENING VECTOR CONTROLLER FOR PERMANENT MAGNET SYNCHRONOUS MOTOR AND CONTROL MODULE

CLAIM OF PRIORITY

The present application claims priority from Japanese application serial no. 2005-303817, filed on Oct. 19, 2005, the content of which is hereby incorporated by reference into this application.

BACKGROUND OF THE INVENTION

1. Field of the Invention

The present invention relates to a field weakening vector controlling method for permanent magnet synchronous motor and a control module.

2. Description of the Prior Art

As conventional technologies for vector-controlling in a field weakening region, Japanese Patent Laid-open No. Hei 08(1996)-182398 discloses a method of forming a table of d-axis current command values and controlling d- and q-axis currents proportionally and Japanese Patent Laid-open No. 2002-95300 discloses a method of obtaining a terminal voltage of a motor from d- and q-axis current controllers and calculating the d-axis current command value by proportional integration of a difference between the terminal voltage command value and the terminal voltage.

SUMMARY OF THE INVENTION

The method of Japanese Patent Laid-open No. Hei 8(1996)-182398, however, cannot generate such currents as they are commanded and cannot assure high torque accuracy. Similarly, Japanese Patent Laid-open No. 2002-95300 does not generate d-axis current commands quickly and cannot assure high torque response.

An object of the invention is to provide a field weakening vector controller for a permanent magnet synchronous motor which can accomplish a high-precision, high-response, and high-stability motor torque control even in a field weakening region.

In one preferred embodiment of the invention, a q-axis current command value is corrected by a product of a d-axis current command value calculated by field weakening control (or a current detection value) and a sine signal of a phase difference which is a difference between the reference axis of control and the reference axis of the motor (or a phase difference).

According to one embodiment of the invention, a field weakening vector controller of a permanent magnet synchronous motor which can accomplish a high-precision, high-response, and high-stability motor torque control even in a field weakening region is provided.

DESCRIPTION OF THE PREFERRED EMBODIMENTS

The present invention will be described with reference to the details of the embodiments of the invention shown in the accompanying drawings.

Embodiment 1

Figure 1:
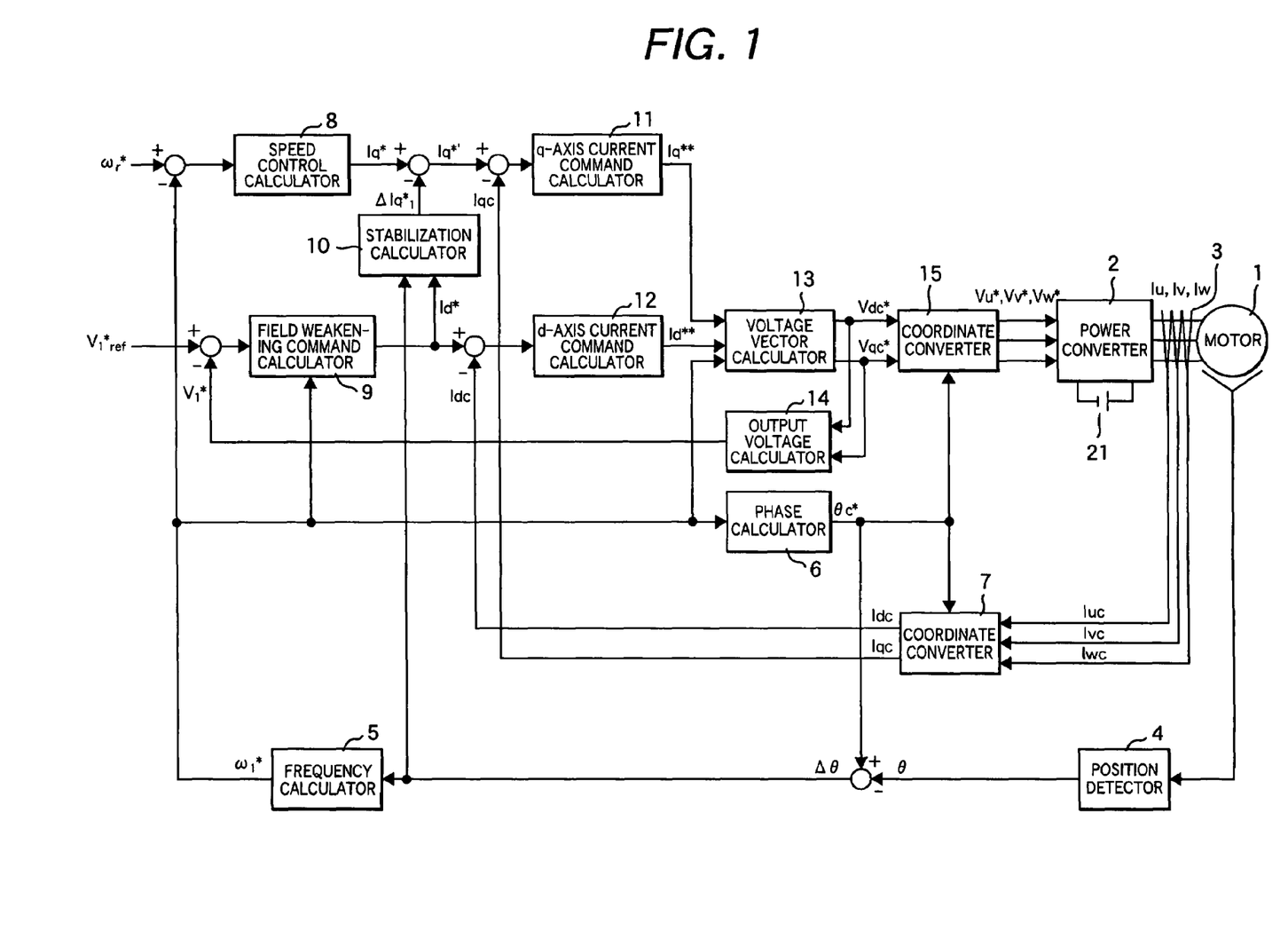
FIG. 1 shows a schematic diagram of a field weakening vector controller for a permanent magnet synchronous motor which is an embodiment of this invention.

FIG. 1 shows a schematic diagram of an example of a field weakening vector controller for a permanent magnet synchronous motor which is an embodiment of this invention.

This example is equipped with the following:

Permanent magnet synchronous motor 1,

Power converter 2 which outputs voltages proportional to 3-phase AC voltage command values Vu*, Vv*, and Vw*, DC power supply 21, Power detector 3 which can detect 3-phase AC currents Iu, Iv, and Iw, Position detector 4 made of hall ICs and hall elements to detect motor positions θ, Frequency calculator 5 which calculates frequency command value $\omega_1^*$ from axial difference Δθ which is a difference between rotational phase command θc* and position detection value θ, Phase calculator 6 which integrates frequency command value $\omega_1^*$ and outputs motor rotation phase command θc*, Coordinate converter 7 which inputs detection current values (Iuc, Ivc, and Iwc) of the 3-phase AC currents (Iu, Iv, and Iw) and rotational phase command θc* and outputs d- and q-axis current detection values Idc and Iqc, Speed control calculator 8 which calculates first q-axis current command value Iq* from a difference between speed command value $\omega_r^*$ and frequency command value $\omega_1^*$, Field weakening command calculator 9 which calculates first d-axis current command value Id* from a difference between output voltage command $V_1^*{}_{ref}$ and output voltage $V_1^*$ in a weakening field, Stabilization calculator 10 which inputs first d-axis current command value Id* and a sine signal of the axis error Δθ and outputs signal $\Delta Iq^*_1$ to correct q-axis current command value Iq*, q-axis current command calculator 11 which outputs second q-axis current command value Iq** in accordance with a difference between q-axis current detection value Iqc and new q-axis current command value Iq* obtained by subtracting $\Delta Iq^*_1$ from first q-axis current command value $I_q^*{}'$, d-axis current command calculator 12 which outputs second d-axis current command value Id** in accordance with the difference between first d-axis current command value Id* and d-axis current detection value Idc, Voltage vector calculator 13 which calculates voltage command values Vdc* and Vqc* from the electric constant of motor 1, second current command values (Id and Iq), and frequency command value $\omega_1^*$, Output voltage calculator 14 which calculates output voltage $V_1^*$ of the power converter from voltage command values Vdc* and Vqc*, and Coordinate converter 15 which inputs voltage command values (Vdc* and Vqc*) and rotational phase command θc* and outputs 3-phase AC voltage command values (Vu*, Vv* and Vw*).

First will be explained the basic voltage and phase control operations of a vector control method using a stabilization calculator 10 which is characterized by this invention.

In voltage control, output voltage calculator 14 of FIG. 1 calculates output voltage $V_1^*$ from d- and q-axis voltage command values Vdc* and Vqc* as expressed by Equation 1.

$$V_1^* = \sqrt{Vdc^{*2} + Vqc^{*2}} \qquad (1)$$

Field weakening command calculator 9 calculates first d-axis current command value Id* so that output voltage $V_1^*$ may be equal to output voltage command value $V_1^*{}_{ref}$ in the field weakening region.

Using equation 2, voltage vector calculator 13 calculates a motor constant, and calculates d- and q-axis voltage command values Vdc* and Vqc* from second d- and q-axis current command values Id and Iq. Voltage vector calsulator 13 uses these values to control the converter output voltage.

$$\begin{bmatrix} Vdc^* = R^* \times Id^{**} - \omega_1^* \times Lq^* \times Iq^{**} \\ Vac^* = R^* \times Iq^{**} + \omega_1^* \times Ld^* \times Id^{**} + \omega_1^* \times Ke^* \end{bmatrix} \qquad (2)$$

where
R*: Preset resistance
Ke*: Preset induced voltage constant
Ld*: Preset d-axis inductance
Lq*: Preset q-axis inductance Meanwhile, in phase control, position detector 4 detects the rotational position of the motor and obtains position detection value θ. Frequency calculator 5 calculates frequency command value $\omega_1^*$ by a proportional integration so that axis error Δθ (=θc*−θ) which is a difference between rotational phase command θc* and position detection value θ may be 0. Phase calculator 6 proportionally integrates frequency command value $\omega_1^*$ and controls rotational phase command θc*.

The above description is for the basic voltage and phase control operations.

Next will be explained stabilization calculator 10.

Stabilization calculator 10 calculates stabilization signal $\Delta Iq^*_1$ which is a product of d-axis current command value Id* and a sine signal of axis error Δθ by Equation 3.

$$\Delta Iq_1^* = \sin \Delta\theta \times Id^* \qquad (3)$$

The advantages of this invention will be explained with reference to this embodiment.

This description assumes only control characteristics of generating d-axis current command value Id* by field weakening command calculator 9 "without a stabilization operation ($\Delta Iq^*_1=0$)."

Figure 2:
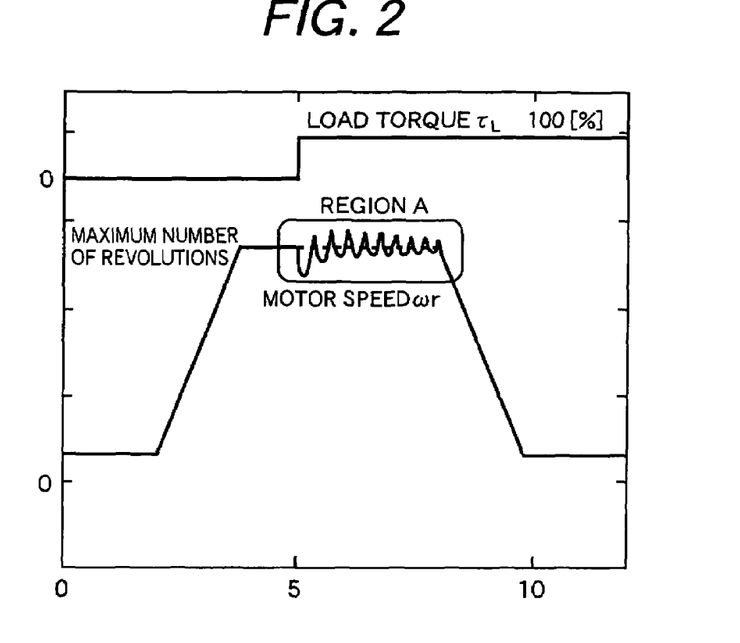
FIG. 2 shows the motor operation characteristics without a stabilization calculator 10.

FIG. 2 shows the motor operation characteristics without a stabilization operation ($\Delta Iq^*_1=0$). In FIG. 2, the motor is accelerated from a low speed region to the maximum rotational speed. When a load torque of 100 [%] is given to the motor, motor speed $\omega_r$ vibrates in region A which is a field weakening region.

When the rotational speed is reduced in this state, the motor speed goes out the field weakening region and stops vibrating. This vibration causes "noises" and "motor stops due to over current."

Next will be explained this cause. When the synthetic inertia of the motor and a mechanical load are low, even a little torque fluctuation will cause the motor position to fluctuate.

When there exists axis error Δθ (=θc* −θ) which is a difference between rotational phase command θc* and position detection value θ, a coordinate conversion matrix from the motor axis side (d-q) to the control side (dc-qc) is expressed by Equation 4.

$$\begin{bmatrix} dc \\ qc \end{bmatrix} = \begin{bmatrix} \cos\Delta\theta & \sin\Delta\theta \\ -\sin\Delta\theta & \cos\Delta\theta \end{bmatrix} \begin{bmatrix} d \\ q \end{bmatrix} \qquad (4)$$

d- and q-axis current detection values Idc and Iqc can be expressed by Equation 5.

$$\begin{bmatrix} Idc \\ Iqc \end{bmatrix} = \begin{bmatrix} \cos\Delta\theta & \sin\Delta\theta \\ -\sin\Delta\theta & \cos\Delta\theta \end{bmatrix} \begin{bmatrix} Id \\ Iq \end{bmatrix} \qquad (5)$$

From Equation 5, it is found that q-axis current detection value Iqc contains information of d-axis current Id on the motor axis.

Here, when axis error Δθ exists, closed loop transfer function $G_{asr}(S)$ from speed command value $\omega_r^*$ to frequency command value $\omega_1^*$ is expressed by Equation 6.

$$G_{asr}(s) = \frac{(Ksp/Ksi/Kci)s^3 + (Ksp/Ksi \times Kcp/Kci + 1/Kci)s^2 + (Ksp/Ksi + Kcp/Kci)s + 1}{(1/Kci)s^5 + (Ksp/Ksi + \omega_{acr}/Kci)s^4 + (1 + Kcp \times \omega_{acr}/Kci)s^3 + \omega_{acr}(1 + Kt \times Pm/Kci/J \times Id)s^2} \cdot \frac{Ksi \cdot Pm \cdot Kt \cdot \omega_{acr}}{J} \qquad (6)$$

where
Ksp: Speed control proportional gain
Ksi: Speed control integration gain
Kcp: Frequency calculator proportional gain
Kci: Frequency calculator integration gain
Pm: Pole logarithm
Kt: Torque coefficient
$\omega_{ACR}$: Current control response angle frequency
J: Inertia value In Equation 6, the condition of keeping the feedback loop stable is expressed by Equation 7. Lines 1 and 2 of Equation 7 are always "positive polarity."

$$\begin{bmatrix} Ksp/Ksi + \omega_{acr}/Kci & > 0 \\ 1 + Kcp \times \omega_{acr}/Kci & > 0 \\ 1 + Kt \times Pm/Kci/J \times Id & > 0 \end{bmatrix} \qquad (7)$$

However, d-axis current Id on line 3 is "negative polarity" in the field weakening region. Therefore, the condition of keeping the feedback loop stable is expressed by Equation 8.

$$1 > Kt \times Pm / Kci / J \times |Id| \tag{8}$$

Let's assume that integration gain Kci of frequency calculator 5 is set as expressed by Equation 9.

$$Kci = \frac{(2\pi F_{PLL})^2}{N} \tag{9}$$

where N is a break point ratio of the proportional integration gain of frequency calculator 5.

From Equation 8 and Equation 9, control response frequency $F_{PLL}$ can be expressed by Equation 10.

$$F_{PLL} > \frac{1}{2\pi} \cdot \sqrt{\frac{N \cdot kt \cdot Pm}{J} \cdot |Id|} \tag{10}$$

In other words, for stabilization of a feedback loop, it is necessary to set control response frequency FPLL which is set for frequency calculator 5 assuming the maximum d-axis current Id so that Equation 10 may be satisfied.

When inertia J is small, control response frequency $F_{PLL}$ must be set greater. However, $F_{PLL}$ cannot be infinite since the operation cycle of the microcomputer is limited.

To solve this problem, stabilization calculator 10 that can assure stabilization of the field weakening region is provided independently of control response frequency $F_{PLL}$ to be set for frequency calculator 5.

Stabilization calculator 10 subtracts a component of d-axis current Id at the occurrence of axis error Δθ from q-axis current command value Iq* in advance and outputs the result as input command signal Iq*' to q-axis current command calculator 11.

Input signal Iq*' is expressed by Equation 11.

$$Iq^{*\prime} = Iq^* - \Delta Iq_1^* \tag{11}$$
$$= Iq^* + \sin\Delta\theta \times Id^*$$

With this, a signal which is a difference between Iq*' and Iqc (see Equation 12) is fed to q-axis current command calculator 11.

$$Iq^{*\prime} - Iqc = (Iq^* - \sin\Delta\theta \times Id^*) - (\cos\Delta\theta \times Iq - \sin\Delta\theta \times Id) \tag{12}$$

Id*=Idc since d-axis current command calculator 12 controls to make d-axis current detection value Idc equal to command value Id*. As for the vibration component of Δθ, cosΔθ is approximately 0 and sinΔθ is approximately Δθ.

$$Iq^{*\prime} - Iqc = (Iq^* - \Delta\theta \times Id^*) - (Iq - \Delta\theta \times Id) \tag{13}$$
$$\approx (Iq^* - Iq) + (\Delta\theta \times Id - \Delta\theta \times Id^*)$$
$$\approx Iq^* - Iqc$$

As seen from Equation 13, information of d-axis current Id on the motor axis is already cancelled.

In other words, by calculating Equation 11, the loop expressed by Equation 6 is lost and stable field weakening control can be accomplished.

Figure 3:
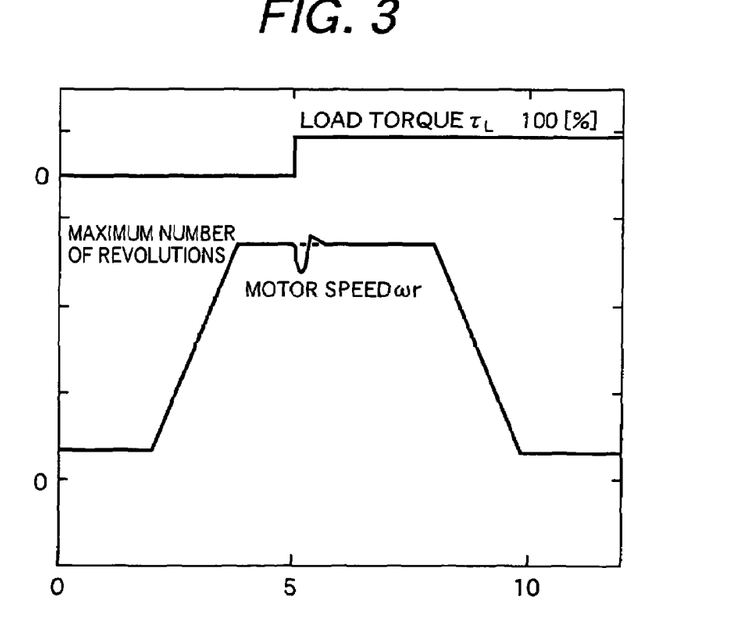
FIG. 3 shows the motor operation characteristics with a stabilization calculator 10.

FIG. 3 shows the motor operation characteristics after the stabilization compensation is made.

Thanks to the stabilization compensation, it is found that the motor runs stably even in the field weakening region.

Although this embodiment uses d-axis current command value Id* and a sine signal of axis error Δθ in stabilization calculator 10 to calculate stabilization signal $\Delta Iq^*_1$, the same effect can be obtained by using d-axis current detection value Idc and axis error Δθ directly.

Embodiment 2

Figure 4:
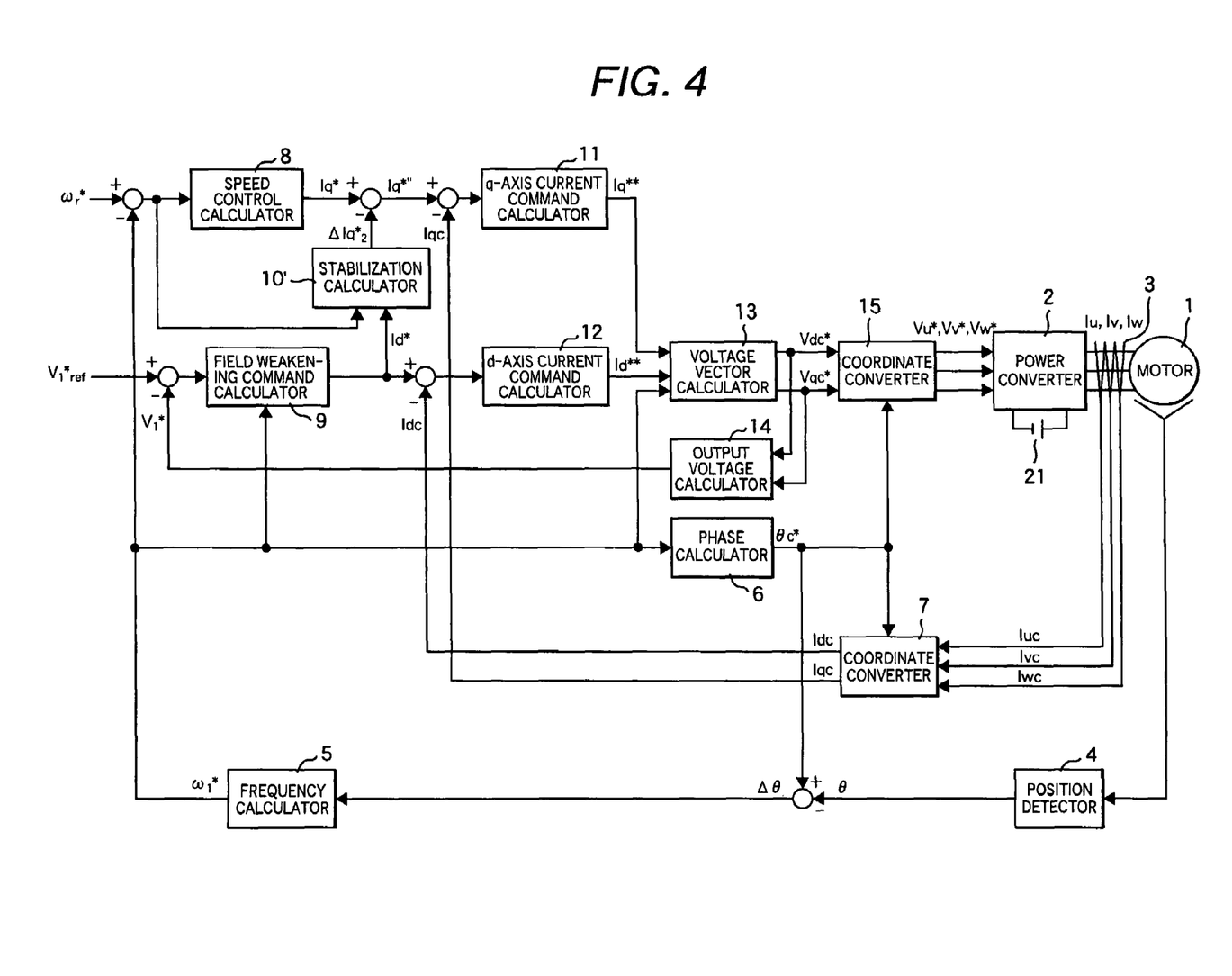
FIG. 4 shows a schematic diagram of a field weakening vector controller for a permanent magnet synchronous motor which is another embodiment of this invention.

FIG. 4 shows a schematic diagram of another embodiment of this invention.

Embodiment 2 is a vector controller of a permanent magnet synchronous motor which uses speed difference ($\omega_r^* - \omega_1^*$) and d-axis current command value Id* although Embodiment 1 uses axis error Δθ and d-axis current command value Id*.

Components 1 to 9, 11 to 15, and 21 in FIG. 4 are the same as those of FIG. 1. Stabilization calculator 10' corrects q-axis current command value Iq* by d-axis current command value Id* and speed difference ($\omega_r^* - \omega_1^*$) which is a difference between speed command value ($\omega_r^*$ and frequency command value $\omega_1^*$.

Assuming that the differential value of axis error Δθ is speed difference ($\omega_r^* - \omega_1^*$), stabilization calculator 10' calculates stabilization signal $\Delta Iq^*_2$ using proportional integration gains Kcp and Kci of frequency calculator 5 as expressed by Equation 14.

$$\Delta Iq2^* = \cdot(\omega_r^* + \omega_1^*) \cdot \frac{(1/Kci) \cdot s}{(Kcp/Kci) \cdot s + 1} \cdot Id^* \tag{14}$$

Next, stabilization calculator 10' subtracts stabilization signal $\Delta Iq^*_2$ from the first q-axis current command value by Equation 15 and outputs the result as input signal Iq*''' to q-axis current command calculator 11.

$$Iq^{*\prime\prime\prime} = Iq^* - \Delta Iq^*_2 \tag{15}$$

With this, this embodiment can accomplish stabilization of the field weakening region without using axis error Δθ.

Although this embodiment uses d-axis current command value Id* for operation in stabilization calculator 10', the same effect can be obtained by using d-axis current detection value Idc instead of it.

Embodiment 3

Figure 5:
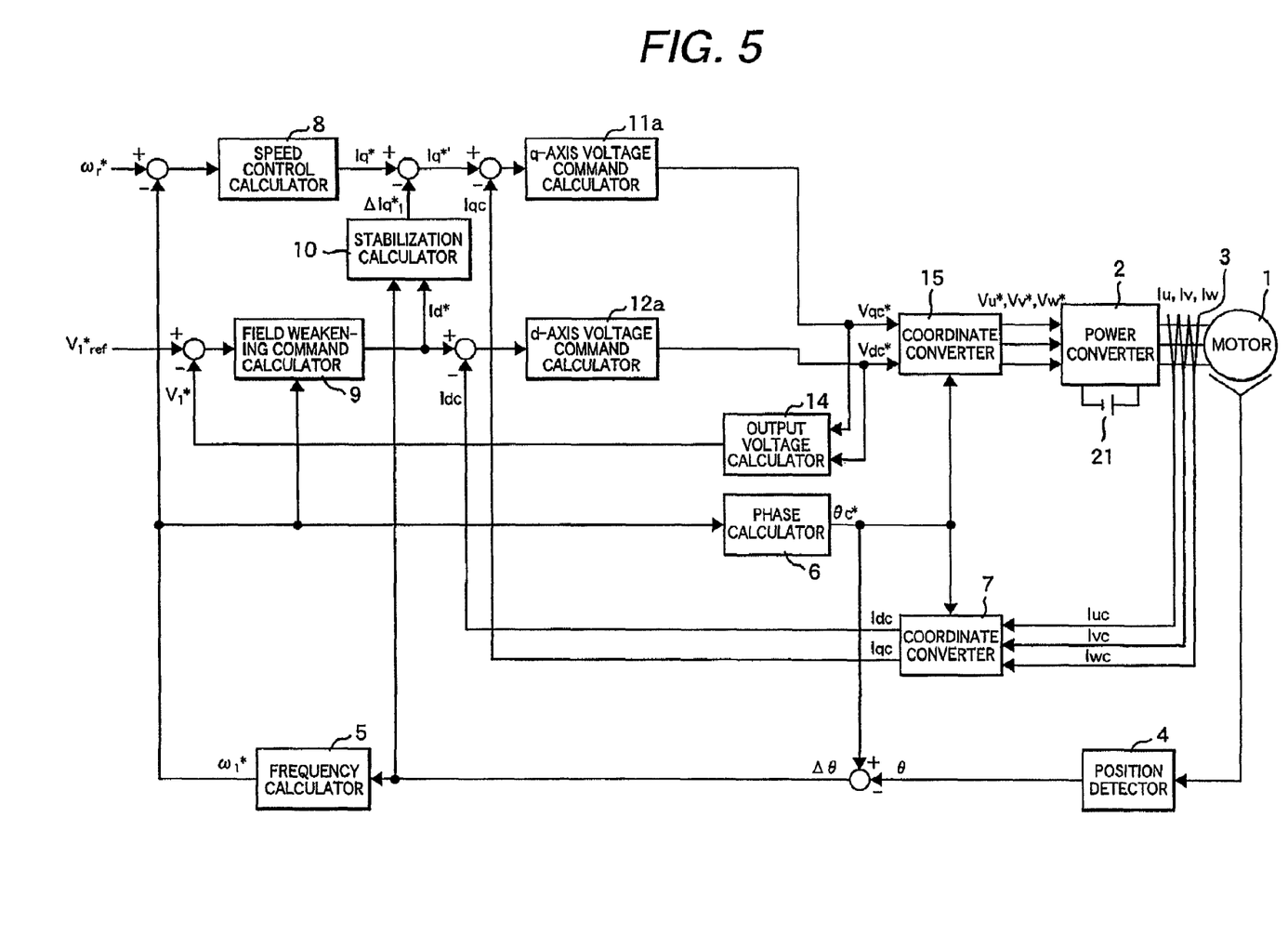
FIG. 5 shows a schematic diagram of a field weakening vector controller for a permanent magnet synchronous motor which is another embodiment of this invention.

FIG. 5 shows a schematic diagram of still another embodiment of this invention.

Embodiment 3 is a field weakening vector controller of a permanent magnet synchronous motor equipped with d-and q-axis voltage command calculators to which stabilization calculation is applied.

Components 1 to 10, 14, 15, and 21 in FIG. 5 are the same as those of FIG. 1.

Q-axis voltage command calculator 11a calculates q-axis voltage command value Vqc* from a difference between q-axis current command value Iq*' which was corrected by stabilization compensation output $\Delta Iq^*_1$ and q-axis current detection value Iqc. D-axis voltage command calculator 12a calculates d-axis voltage command value Vdc* from a difference between d-axis current command value Id* and d-axis current detection value Idc. Also by using this method, the similar effect to that of Embodiment can be obtained.

Although Embodiment 3 uses a stabilization calculator of the method shown in FIG. 1, the similar effect can be obtained by a stabilization calculator of the method shown in FIG. 4.

Embodiment 4

Figure 6:
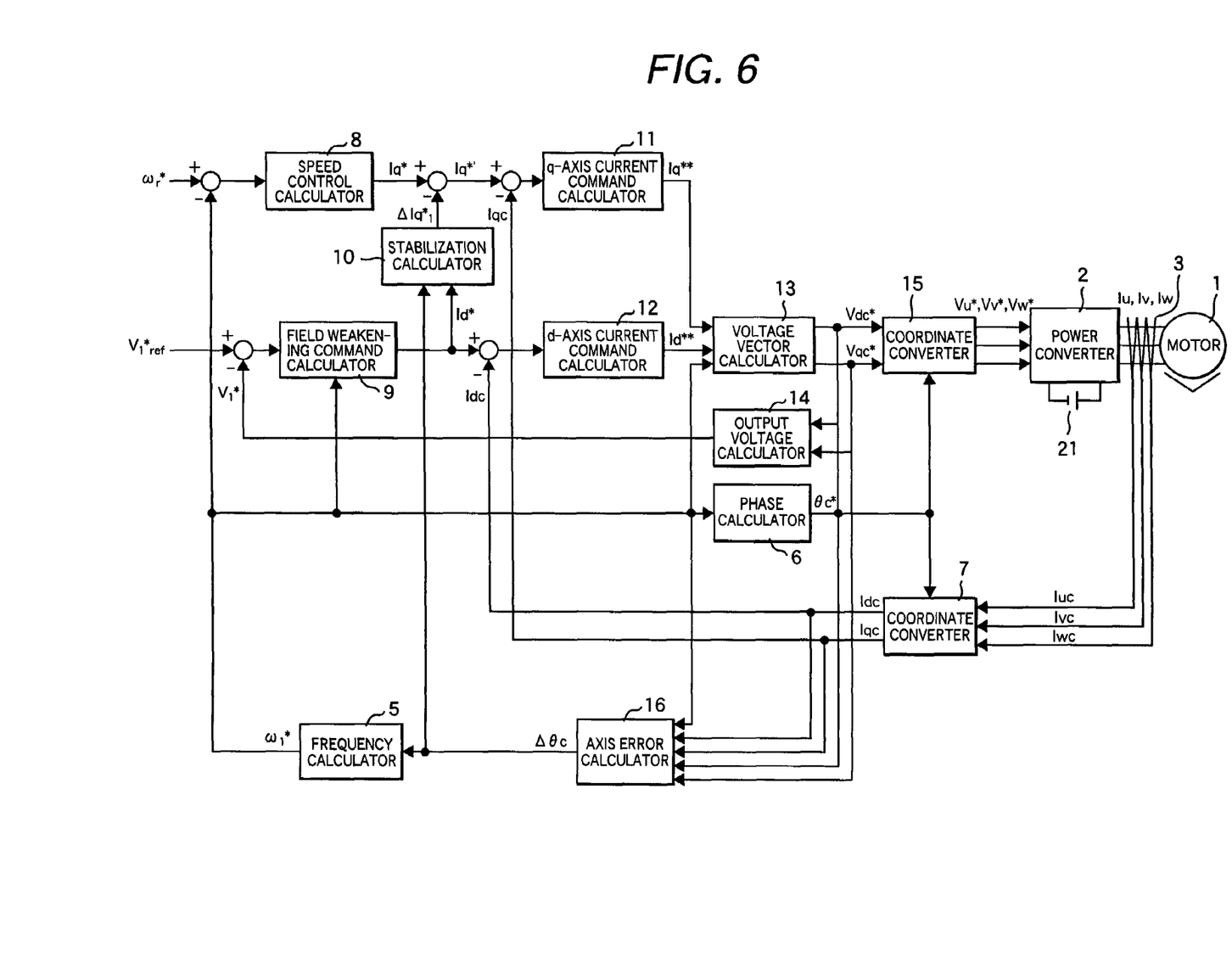
FIG. 6 shows a schematic diagram of a field weakening vector controller for a permanent magnet synchronous motor which is another embodiment of this invention.

FIG. 6 shows a schematic diagram of still another embodiment of this invention.

Embodiment 4 is a field weakening vector controller of a permanent magnet synchronous motor which calculates axis errors from d- and q-axis voltage command values, current detection values and a motor constant, to which stabilization calculation is applied.

Components 1 to 3, 5 to 15, and 21 in FIG. 6 are the same as those of FIG. 1. Axis error calculator 16 calculates axis error AOc as expressed by Equation 16.

$$\Delta\theta c = \tan^{-1}\left[\frac{Vdc^* - R^* \times Idc + \omega_1^* \times Lqc^* \times Iqc}{Vqc^* - R^* \times Iqc - \omega_1^* \times Lqc^* \times Idc}\right] \quad (16)$$

Stabilization calculator 10 calculates stabilization signal $\Delta Iq^*_1$ from axis error $\Delta\theta c$ as expressed by Equation 17.

$$\Delta Iq_1^* = \sin \Delta\theta c \times Id^* \quad (17)$$

It is apparent this position sensor-less control method can also works in the way similar to the above embodiments and the same effect can be obtained.

Although Embodiment 4 uses a stabilization calculator of the method shown in FIG. 6, the similar effect can be obtained by a stabilization calculator of the method shown in FIG. 4.

Embodiment 5

Embodiments 1 to 4 use expensive current detectors 3 to detect 3-phase AC currents (Iu, Iv, and Iw). These methods can also be applied to control devices which detect currents inexpensively.

Figure 7:
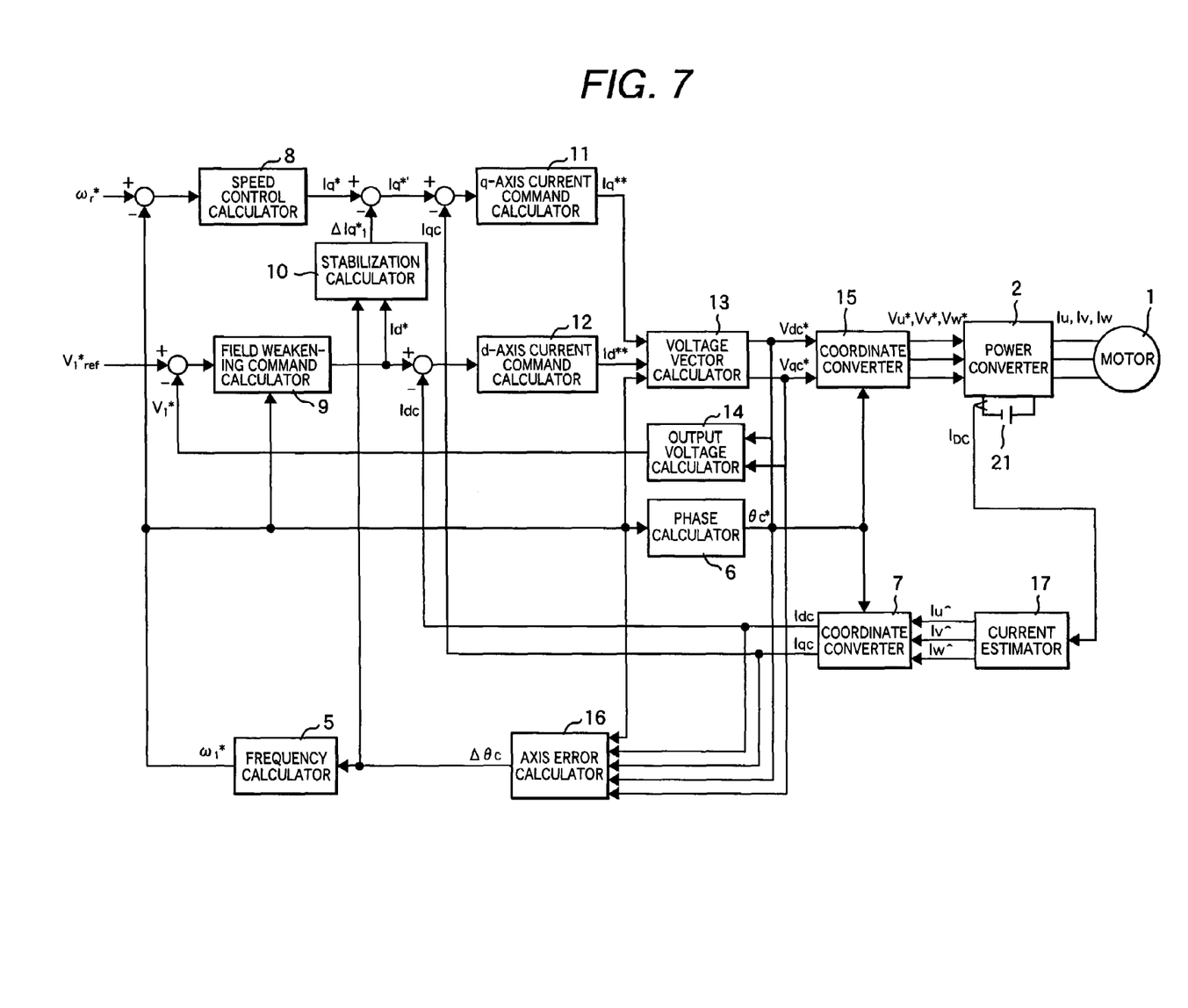
FIG. 7 shows a schematic diagram of a field weakening vector controller for a permanent magnet synchronous motor which is another embodiment of this invention.

FIG. 7 shows a schematic diagram of Embodiment 5 of this invention.

Components 1, 2, 5 to 16, and 21 in FIG. 7 are the same as those of FIG. 1. Current estimator 17 estimates 3-phase AC currents Iu, Iv, and Iw which flow through motor 1 from DC current $I_{DC}$ which flows along the input bus of the power converter.

Coordinate converter 7 calculates d- and q-axis current detection values Idc and Iqc from these estimated current values Iu^, Iv^, and Iw^.

Also in this current sensor-less control method, Id* is equal to Idc and Iq* is equal to Iqc. Therefore, it is apparent this current sensor-less control method can also works in the way similar to the above embodiments and the same effect can be obtained.

Although Embodiment 5 uses a stabilization calculator of the method shown in FIG. 1, the similar effect can be obtained by a stabilization calculator of the method shown in FIG. 4.

Embodiment 6

Figure 8:
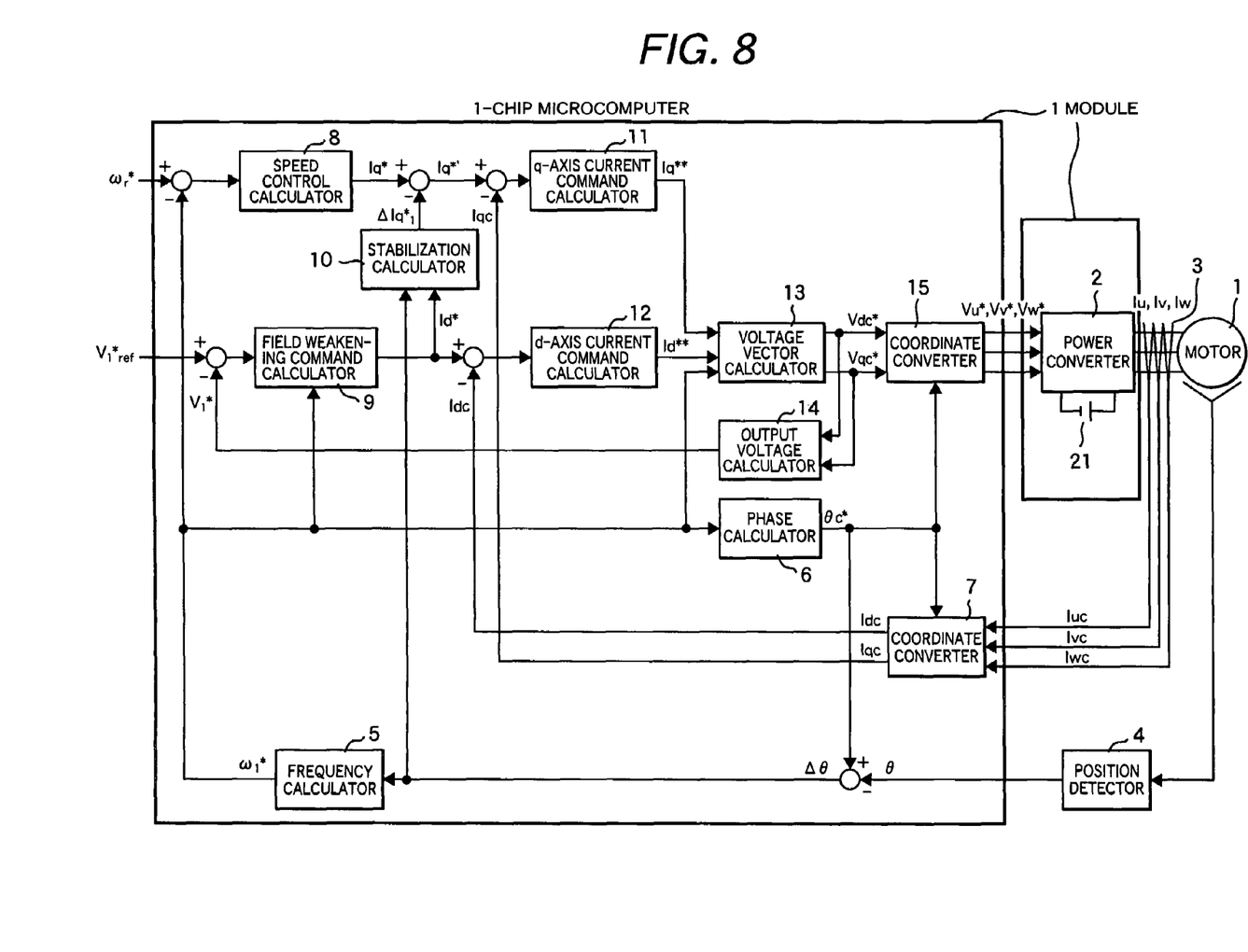
FIG. 8 shows a schematic diagram of an embodiment of this invention.

An example of applying this invention to a module will be explained with reference to FIG. 8. Embodiment 6 applies Embodiment 1 to a module.

Here, frequency calculator 5, phase calculator 6, coordinate converter 7, speed control calculator 8, field weakening command calculator 9, stabilization calculator 10, q-axis current command calculator 11, d-axis current command calculator 12, voltage vector calculator 13, output voltage calculator 14, and coordinate converter 15 are built in a 1-chip microcomputer.

Further, the 1-chip microcomputer and the power converter are built on a printed circuit board in a single module. Here, a "module" means a "standardized unit of composition" and contains hardware and software components that can be separated. For production reasons, it is preferable that the components are built on a single printed circuit board, but the invention is not limited to a single board. The components can be mounted on two or more printed circuit boards in a single casing. The other embodiments can also be constructed in the same manner.

As described above, this invention can provide a field weakening vector controller of a permanent magnet synchronous motor which accomplishes a high-precision, high-response, and high-stability motor torque control even in a field weakening region.

What is claimed is:

1. A field weakening vector controller which calculates a d-axis current command value so that the output voltage of a power converter which drives a permanent magnet synchronous motor may be a preset value, wherein:

said filed weakening vector controller comprises a stabilization calculator, a d-axis current command calculator, a q-axis current command calculator, and a phase calculator;

said d-axis current command calculator corrects the d-axis current command value using a difference between the d-axis current command value and the d-axis current detection value;

said stabilization calculator calculates a product of a phase error or a sine signal of the phase error which is the difference between the reference axis of control calculated by said phase calculator and a reference axis of the motor, and the d-axis current command value or the d-axis current detection value; and said q-axis current command calculator corrects the q-axis current command value using the product.

2. The field weakening vector controller in accordance with claim 1, wherein the output voltage of the power converter is calculated from first d- and q-axis current command values, a second current command value calculated from a detected current value, a motor constant, and a frequency calculation value.

3. The field weakening vector controller in accordance with claim 1, wherein the output voltage of the power converter is calculated from the d- and q-axis current command values and the detected current value.

4. The field weakening vector controller in accordance with claim 1, wherein the phase error is calculated from d- and q-axis voltage command values and a motor current.

5. The field weakening vector controller in accordance with claim 1, wherein the motor current is reproduced from the current value detected on the input DC bus of the power converter.

6. A field weakening vector controller which calculates a d-axis current command value so that the voltage output from a power converter which drives a permanent magnet synchronous motor may be a preset value, wherein:

said field weakening a vector controller comprises a stabilization calculator, a d-axis current command calculator, a q-axis current command calculator, a phase calculator, and a frequency calculator;

said d-axis current command value using a difference between the d-axis current command value and the d-axis current detection value;

said stabilization calculator calculates a product of a differential value of a speed error which is the difference between a speed command value calculated by said frequency calculator and a calculated speed value, and the d-axis current command value or the d-axis current detection value; and said q-axis current command calculator corrects the q-axis current command value using the product.

7. The field weakening vector controller in accordance with claim 6, wherein the output voltage of the power converter is calculated from first d- and q-axis current command values, a second current command value calculated from a detected current value, a motor constant, and a frequency calculation value.

8. The field weakening vector controller in accordance with claim 6, wherein the output voltage of the power converter is calculated from the d- and q-axis current command values and the detected current value.

9. The field weakening vector controller in accordance with claim 6, wherein the phase error is a difference between a speed command value which is obtained by estimating a phase error from d- and q-axis voltage command values and a speed command value which is obtained from a detected motor current so that the phase error is zero.

10. The field weakening vector controller in accordance with claim 6, wherein the motor current is reproduced from the current value detected on the input DC bus of the power converter.

11. A control module comprising:
the vector controller of claim 6; and
a power converter which converts D.C. to A.C.

12. A control module for a field weakening vector controller comprising: a power converter which converts D.C. to A.C.; and
a vector controller which calculates a d-axis current command value so that the output voltage of a power converter which drives a permanent magnet synchronous motor may be a preset value, wherein:

said vector controller comprises a stabilization calculator, a d-axis current command calculator, a q-axis current command calculator, and a phase calculator;

said d-axis current command calculator corrects the d-axis current command value using a difference between the d-axis current command value and the d-axis current detection value;

said stabilization calculator calculates a product of a phase error or a sine signal of the phase error which is the difference between the reference axis of control calculated by said phase calculator and a reference axis of the motor, and the d-axis current command value or the d-axis current detection value; and said q-axis current command calculator corrects the q-axis current command value using the product.

* * * * *